United States Patent [19]

Wada et al.

[11] Patent Number: 4,943,882
[45] Date of Patent: Jul. 24, 1990

[54] THIN-FILM, PERPENDICULAR MAGNETIC RECORDING AND REPRODUCING HEAD

[76] Inventors: Toshiaki Wada; Akio Murata, both of Mishima-gun, Japan

[21] Appl. No.: 289,422

[22] Filed: Dec. 23, 1988

Related U.S. Application Data

[63] Continuation-in-part of Ser. No. 42,250, Apr. 24, 1987, abandoned.

[30] Foreign Application Priority Data

Feb. 9, 1987 [JP] Japan ................. 62-28695

[51] Int. Cl.$^5$ .............................. G11B 5/147
[52] U.S. Cl. ........................ 360/126; 29/603; 360/122
[58] Field of Search ............. 360/126, 122, 125, 127; 29/603

[56] References Cited

U.S. PATENT DOCUMENTS

| | | | |
|---|---|---|---|
| 4,651,248 | 3/1987 | Shiiki et al. | 360/126 |
| 4,685,014 | 8/1987 | Hanazono et al. | 29/603 X |
| 4,716,484 | 12/1987 | Kaminaka et al. | 360/126 |
| 4,743,988 | 5/1988 | Sato | 360/126 |
| 4,855,854 | 8/1989 | Wada et al. | 360/126 |

FOREIGN PATENT DOCUMENTS

| | | | |
|---|---|---|---|
| 0176524 | 10/1982 | Japan | 360/126 |
| 0104717 | 6/1984 | Japan | 29/603 |
| 0129913 | 7/1985 | Japan | 29/603 |

*Primary Examiner*—David J. Severin
*Attorney, Agent, or Firm*—Watson, Cole, Grindle & Watson

[57] ABSTRACT

A thin-film, perpendicular magnetic recording and reproducing head includes a magnetic substrate having a mechanochemically polished principal surface provided with a plurality grooves filled with a nonmagnetic material and a thin-film conductor coil provided on the polished surface of the substrate. A first insulating layer covering the coil, formed from an inorganic oxide and having a thickness of 0.3 to 3.0 μm is provided therethrough with a via hole which extending to a portion of the surface of the magnetic substrate and a first main pole covers the first insulating layer and extends into the via hole to the surface of the magnetic substrate. A second insulating layer formed from an inorganic oxide covers the first main pole and the first insulating layer and has a finely polished surface in which the first main pole has a finely polished exposed surface. A flat second main pole having a small thickness is provided on the polished surfaces of the first main pole and the second insulating layer. A protective overcoat covers the second main pole and the second insulating layer.

18 Claims, 3 Drawing Sheets

THIN-FILM, PERPENDICULAR MAGNETIC RECORDING AND REPRODUCING HEAD

This application is a continuation-in-part of application Ser. No. 042,250, filed Apr. 24, 1987, now abandoned.

BACKGROUND OF THE INVENTION

1. Field of the Invention

This invention relates to a thin-film, perpendicular magnetic recording and reproducing head.

2. Description of the Prior Art

Thin-film, perpendicular magnetic recording and reproducing heads have a high frequency response, and due to advances in semiconductor technology, highly accurate heads of this type can be manufactured at a low cost. They are expected to be used more commonly than magnetic heads of any other type.

Thin-film, perpendicular magnetic recording and reproducing heads can be classified into inductive heads, which are used for recording and reproducing purposes, and magnetoresistive heads, which are used for reproducing purposes. For example, an inductive head comprises a magnetic substrate formed from, e.g., soft ferrite; an insulating layer located on the magnetic substrate, this insulating layer containing a thin-film conductor; a main pole provided on the insulating layer and formed from Permally, Sendust, or an amorphous alloy; and a protective overcoat covering the main pole. These thin-film, perpendicular magnetic recording and reproducing heads have hitherto been manufactured by a process which involves:

(a) Forming a plurality of appropriately located grooves in a principal surface of a magnetic material, filling the grooves with a nonmagnetic material, such as glass, $SiO_2$, $Al_2O_3$ or barium titanate, and then finely polishing the principal surface of the so-formed magnetic substrate:

(b) Forming a thin-film conductor coil on the polished surface of the magnetic substrate and then forming an insulating layer on the conductor coil, the insulating layer consisting of either an organic material such as a resist or a polyimide, or an inorganic oxide such as $SiO_2$, to provide electrical insulation between the conductor coil and a main pole, the insulating layer having a thickness of 3 to 8 $\mu$m if it is formed from an organic resin, or 5 to 15 $\mu$m if it is formed from an inorganic oxide;

(c) Flattening the exposed surface of the insulating layer by the etchback method employing a resist, which is described, for example, in Technical Report U.S. 86-13 of The Institute of Electrical Communication Engineers of Japan, to remove its unevenness (it is uneven because of the presence of the conductor coil under the insulating layer);

(d) Forming a via hole in the insulating layer so as to provide a magnetic contact between subsequently formed main pole and the magnetic substrate; and (e) Forming the main pole on the exposed surface of the insulating layer and the exposed surface portion of the magnetic substrate, then forming a magnetic film and a protective overcoat thereon, and then cutting the whole assembly to a predetermined size and polishing it.

However, when the insulating layer is formed of an organic resin, such as a photoresist, it has a number of drawbacks. For example, organic resin is so low in heat resistance that it is likely to be decomposed during a heat treatment process. In addition, the insulating layer is likely to be separated from the main pole or the substrate during a heat treatment process because of its higher coefficient of thermal expansion. For example, the insulating layer is decomposed at a temperature of 500° C. during the heat treatment process so that it is separated from the main pole. Also, its low thermal conductivity interferes with the smooth dissipation of the heat which is generated when an electric current is fed to the conductor coil so that a satisfactorily high input current can not be used. Moreover, if an organic resin is exposed in the surface of the head facing a magnetic recording medium, it presents a serious problem such as a head crash.

These problems can be solved if the insulating layer is formed from an inorganic oxide. The layer is, however, required to have a thickness of 5 to 15 $\mu$m. This thickness is so large that it takes an undesirably long time to form the via hole therein.

Another problem with the conventional process is that a sharp edge is formed in the surface the insulating layer adjacent the via hole. As such, that portion of the main pole which overlies this sharp edge of the insulating layer will have a reduced and nonuniform thickness, which will lower its magnetic properties. The magnetic properties of the main pole, particularly, of the main pole having a thickness of less than 1 $\mu$m, usually depend on the nature of the surface of the insulating layer and the substrate, such as roughness and residual stress. In this connection, the conventional process is not satisfactory. In particular, the etchback method is not effective for flattening the surface of the insulating layer and improving the roughness of the surface of the insulating layer, i.e., it is an inefficient method which requires a great deal of time and labor.

SUMMARY OF THE INVENTION

It is, therefore, an object of this invention to provide a thin-film, perpendicular magnetic recording and reproducing head which can be manufactured efficiently and accurately, and yet which has excellent magnetic properties.

This object is essentially attained by a head comprising a magnetic substrate having a mechanochemically polished principal surface provided with a plurality of grooves filled with a nonmagnetic material; a thin-film conductor coil on the polished surface of the substrate; a first insulating layer of an inorganic oxide covering the conductor coil and the principal surface of the magnetic substrate, this first insulating layer having a thickness of 0.3 to 3.0 $\mu$m and including a via hole extending therethrough to expose a surface portion of the principal surface of the magnetic substrate; a first main pole provided on the surface of the first insulating layer and the exposed surface portion of the principal surface of the magnetic substrate; a second insulating layer of an inorganic oxide covering the first main pole and the first insulating layer and having a flattened and finely polished surface to remove its unevenness and to expose a portion of the first main pole; a flat second main pole provided on the exposed portion of the first main pole and the polished surface of the second insulating layer; and a protective overcoat covering the second main pole and the second insulating layer so that an exposed end face of the thin-film magnetic head opposite a magnetic recording medium is composed of the magnetic substrate, the nonmagnetic material filled in the grooves in the principal surface of the magnetic substrate, the first inorganic oxide insulating layer covering the conductor coil, the second insulating layer, the second main pole and the protective overcoat.

The second main pole comprises a thin film and has a coercive force and a permeability which are drastically improved over those of its counterpart conventional thin-film heads. The head of this invention has a recording density $D_{50}$ which is about 1.4 times higher than that of any conventional thin-film head, while providing a high reproducing output over a whole range. The recording density $D_{50}$ is defined as follows, the higher recording density which has 50% of the output at a low recording density of 1 kBPI.

Other features and advantages of this invention will become apparent from the following detailed description and the accompanying drawings.

DETAILED DESCRIPTION OF THE INVENTION

Figure 1:
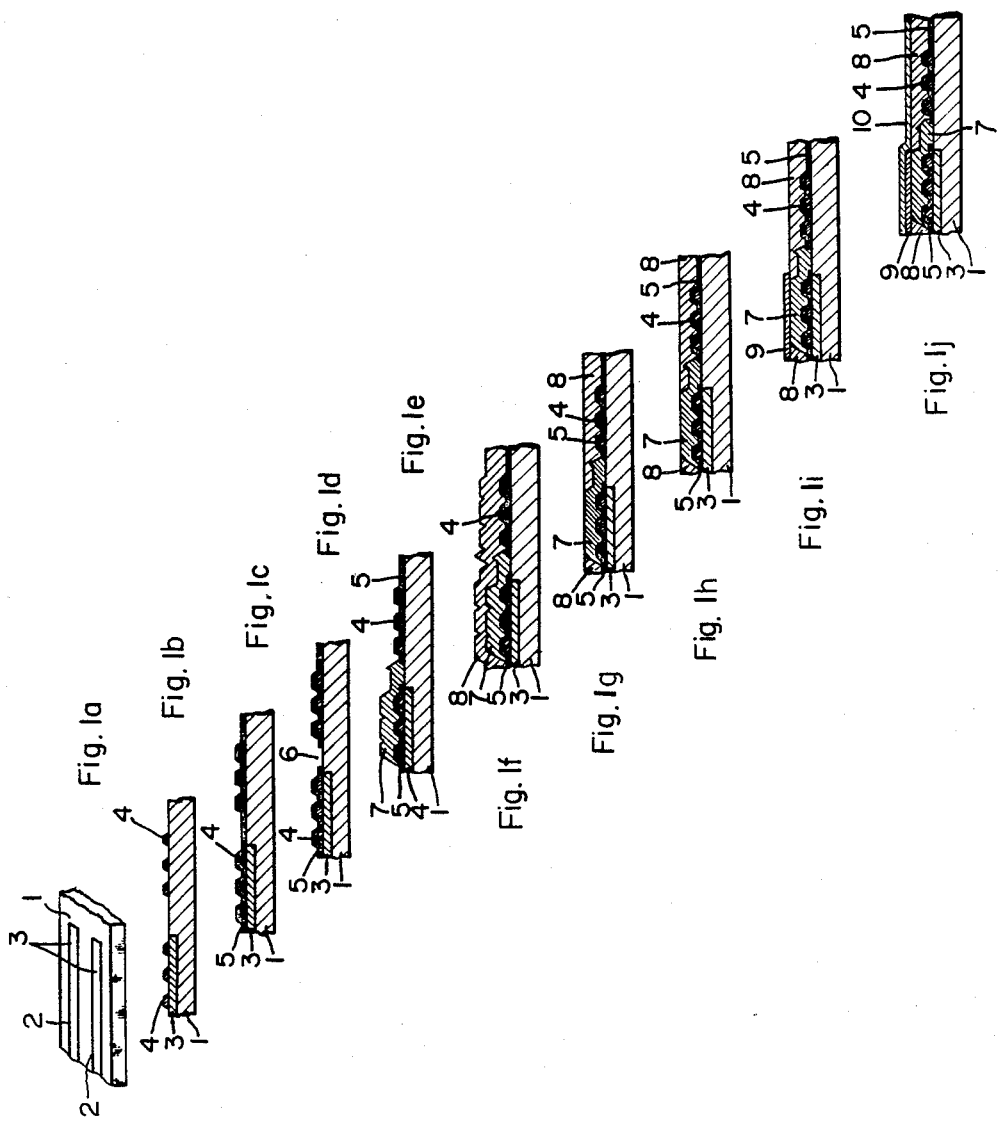
FIGS. 1a–1j show a series of views illustrating a process for manufacturing a thin-film, perpendicular magnetic recording and reproducing head embodying this invention, by way of example, FIG. 1a showing a persepective view of the magnetic substrate which is used in the process and FIGS 1b–1j showing a cross-section of enlarged end views of a portion of the magnetic substrate shown in FIG. 1a and the elements of the thin-film magnetic head sequentially formed thereon.

A process for manufacturing a thin-film, perpendicular magnetic recording and reproducing head embodying this invention is shown by way of example in FIGS. 1a–1j. Its magnetic substrate is formed from Ni-Zn ferrite (ferrite containing NiO and ZnO). The process includes the following steps:

(1) Forming a plurality of appropriately located grooves 2 in a principal surface of the magnetic material 1, filling the grooves 2 with a nonmagnetic material 3, such as glass, $SiO_2$, $Al_2O_3$ or barium titanate, and mechanochemically polishing the principal surface of the so-formed magnetic substrate 1;

(2) Forming a thin-film conductor coil 4, e.g., of copper, or aluminum or gold, on the polished surface of the substrate 1;

(3) Forming a first insulating layer 5 having a thickness of 0.3 to 3.0 μm by sputtering or other suitable technique from an inorganic oxide, such as $SiO_2$ or $Al_2O_3$, to provide electrical insulation between the conductor coil 4 and a first main pole 7;

(4) Forming a via hole 6 in the insulating layer 5 by ion beam or chemical etching or other suitable technique so as to expose a portion of the principal surface of the magnetic substrate and enable a magnetic contact between a subsequently formed first main pole 7 and the magnetic substrate 1;

(5) Forming a first main pole 7 of a large thickness on the insulating layer 5 and that surface portion of the magnetic substrate 1 which has been exposed by the via hole 6 by sputtering or other technique, this first main pole being composed of Permalloy, Sendust or Co-base amorphous alloy;

(6) Forming a second insulating layer 8 of an inorganic oxide such as $SiO_2$ or $Al_2O_3$ over the first main pole 7 and the first insulating layer 5 by sputtering or other technique;

(7) Finely polishing the second insulating layer 8 using a diamond polishing technique or other technique until the first main pole 7 is exposed and the first main pole 7 and the insulating layer 8 have a flattened surface having a roughness not exceeding 500 Å;

(8) Mechanochemically polishing the common polished surface of the first main pole 7 and the second insulating layer 8 so that the surface of the first main pole 7 and that portion of the surface of the insulating layer 8 on which a second main pole 9 will be formed may be relieved from any stress and distortion and be finished to a roughness not exceeding 100 Å, or preferably not exceeding 40 Å;

(9) Forming a second main pole 9 having a small thickness on the mechanochemically polished surface of the first main pole 7 and the second insulating layer 8, by sputtering or other technique, this second main pole being composed of Permalloy, Sendust or an amorphous alloy;

(10) Forming a protective overcoat 10 over the second main pole 9 and the second insulating layer 8; and

(11) Forming a coil bonding post in the conventional manner.

Thus, the thin-film, perpendicular magnetic recording and reproducing head of this invention has an exposed end face opposite a magnetic recording medium (as seen from the left in FIG. 1j), which is composed of the magnetic substrate, the nonmagnetic material filled in the grooves in the principal surface of the magnetic substrate, the first insulating layer covering the conductor coil, the second insulating layer, the second main pole and the protective overcoat.

Since the first insulating layer 5 has a small thickness, i.e., in the range of 0.3 to 3.0 μm, the via hole 6 can be formed therethrough easily and accurately. As the first main pole 7 and the second insulating layer 8 have a highly flattened, distortion-free surface, the second main pole 9 formed thereon will be free from any influence due to the step of providing a via hole in the insulating layer, and it will show greatly improved magnetic properties. The main pole is of a predetermined pattern in its planar structure, through it is not shown in the drawings.

The magnetic substrate can also be formed from Mn-Zn ferrite (ferrite containing MnO and ZnO). In this case, it is necessary to provide a third insulating layer between the substrate and the thin-film conductor coil, as the Mn-Zn ferrite is electrically conductive.

The mechanochemical polishing of the surfaces, which have been polished with diamonds, is very effective for improving their roughness and removing their distortion, as compared with the etchback method employing a resist. It provides for an improved polishing efficiency, a simplified proccess and a shortened polishing time.

According to this invention, the first insulating layer is formed from an inorganic oxide. The use of any organic resin is avoided for the reasons which have hereinbefore been stated. Moreover, if it were formed from an organic resin, the resin might be exposed on the surface of the head facing a magnetic recording medium, adhere to its surface and give rise to serious problems, such as a head crash. The use of an inorganic oxide can overcome any problems which might occur to any insulating layer formed from an organic resin, and can thereby provide a very good thin-film magnetic head. Preferred inorganic oxide include $SiO_2$ or $Al_2O_3$.

The main poles can be formed from an iron alloy such as Permalloy or Sendust, or a Co-base amorphous alloy. The protective overcoat is preferably formed from $Al_2O_3$ or $SiO_2$.

The diamond polishing of the surface perferably employs a diamond powder having a particle diameter not exceeding 1 $\mu$m, a lap base formed from tin, copper or cloth, a lap pressure of 0.01 to 1 $kg/cm^2$ and a rotating speed of 10 to 100 m/min.

The mechanochemical polishing of the surface perferably employs a suspension containing in pure water, 0.5 to 20% by weight of a fine powder of MgO, $ZrO_2$, $Al_2O_3$ or $SiO_2$ having a particle diameter not exceeding 0.1 $\mu$m or a mixture thereof and a disk polisher formed from hard cloth, solder, tin, etc., and disposed rotatably in the suspension. The material to be polished is placed in the suspension and brought into contact with the surface of the polisher at an appropriate pressure and they are rotated relative to each other. The material from which the polisher is formed, the rotating speed and the lap pressure depend on the particle diameter of the powder used, the amount of the powder in the suspension, the material to be polished, etc. A lap pressure of 0.01 to 1.0 $kg/cm^2$ and a rotating speed of 10 to 100 m/min. are usually preferred. The use of any powder having a particle diameter exceeding 0.1 $\mu$m should be avoided, since it is likely to scratch the surface to be polished.

The thin-film conductor coil can be formed by a well-known method, such as sputtering, vapor deposition or plating. The first insulating layer can also be formed by a customary method, such as sputtering or vapor deposition. The main pole can be found by a method such as sputtering, vapor deposition or plating. The protective overcoat can be formed by a customary method, such as sputtering or vapor deposition. The via hole can be formed by a customary method, such as ion beam or chemical etching.

The coil may consist of either a single conductive layer or a plurality of conductive layers. The protective overcoat may have an enlarged thickness, depending on the purpose for which the head will be used.

The invention will now be described more specifically by way of example.

EXAMPLE

A thin-film, perpendicular magnetic recording and reproducing head embodying this invention was prepared by the process as hereinabove described with reference to FIGS. 1a-1j. Its magnetic substrate was formed from Ni-Zn ferrite. After its grooves had been filled with glass, its principal surface was mechanochemically polished and a thin-film conductor coil was formed from copper by sputtering on the polished surface of the substrate.

A first insulating layer of $Al_2O_3$ having a thickness of 2 $\mu$m was formed by sputtering and a via hole was formed therethrough by ion beam etching. A first main pole was formed from a CoZrNb amorphous alloy by sputtering on the surface of the first insulating layer and the exposed surface of the substrate. A second insulating layer was formed thereon from $Al_2O_3$ by sputtering.

The second insulating layer was polished with diamond under the following condition until the first main pole was exposed, so that the layer and the exposed main pole might present a flat surface having a roughness not exceeding 500 Å and the surface was, then, polished mechanochemically under the following conditions:

| | Diamond polishing |
|---|---|
| Diamond | Powder having a particle diameter of 1 $\mu$m; |
| Lap pressure | 0.1 $kg/cm^2$; |
| Rotating speed | 50 m/min.; |
| Lap base | Tin. |
| | Mechanochemical polishing |
| Suspension | Containing in pure water $SiO_2$ powder having a particle diameter of 200 Å; |
| Lap pressure | 0.1 $kg/cm^2$; |
| Rotating speed | 50 m/min.; |
| Lap base | Hard cloth. |

The mechanochemically polished surfaces of the second insulating layer and the first main pole had a roughness not exceeding 30 Å and were free from any distortion. A second main pole was formed from a CoZrNb amorphous alloy by sputtering on the mechanochemically polished surfaces of the first main pole and the second insulating layer. A protective overcoat of $Al_2O_3$ was formed on the second main pole and the second insulating layer.

The thin-film, perpendicular magnetic recording and reproducing head of this invention has an exposed end face opposite the magnetic recording medium which is composed of the magnetic substrate, a glass layer, the first insulating layer, the second insulating layer, the second main pole and the protective overcoat.

For the sake of comparison, a head was prepared by the conventional etchback process which has hereinbefore been described at (a) to (e). Its insulating layer was formed from the same inorganic oxide, but had a thickness of 8 $\mu$m. Its polished surface has a step height of about 1500 Å.

Figure 2:
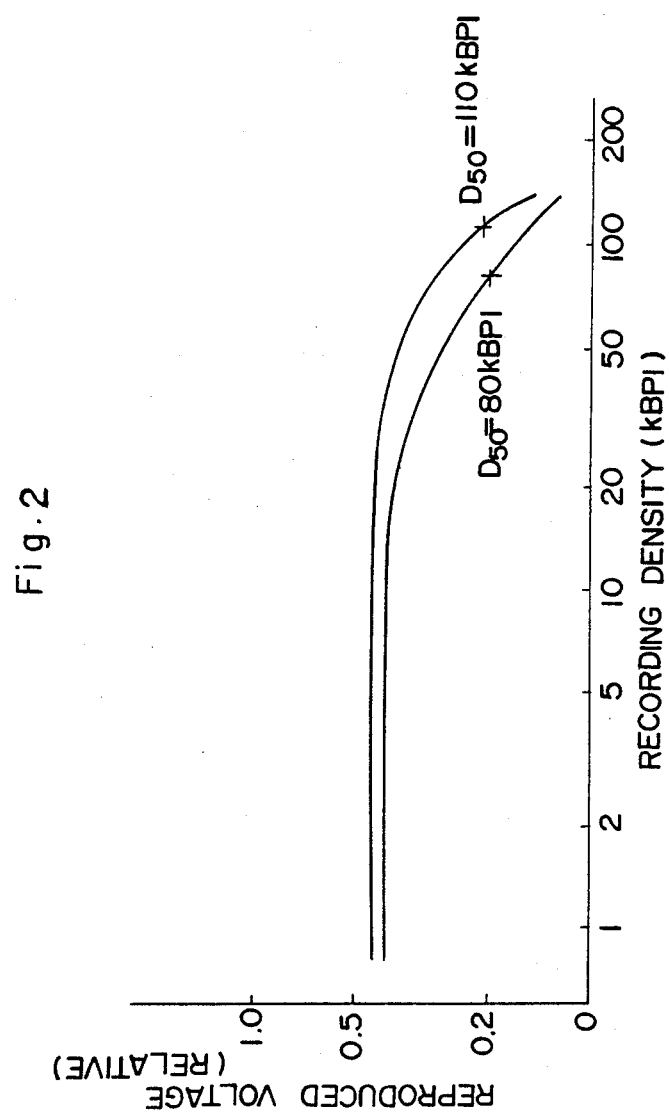
FIG. 2 is a graph showing the relative output vs. recording density of the magnetic head according to this invention and a comparative head, and FIGS. 3 and 4 respectively show a longitudinal sectional view and a front view of an end face of a second embodiment of a thin-film, perpendicular magnetic recording and reproducing head according to the present invention.
Figure 3:
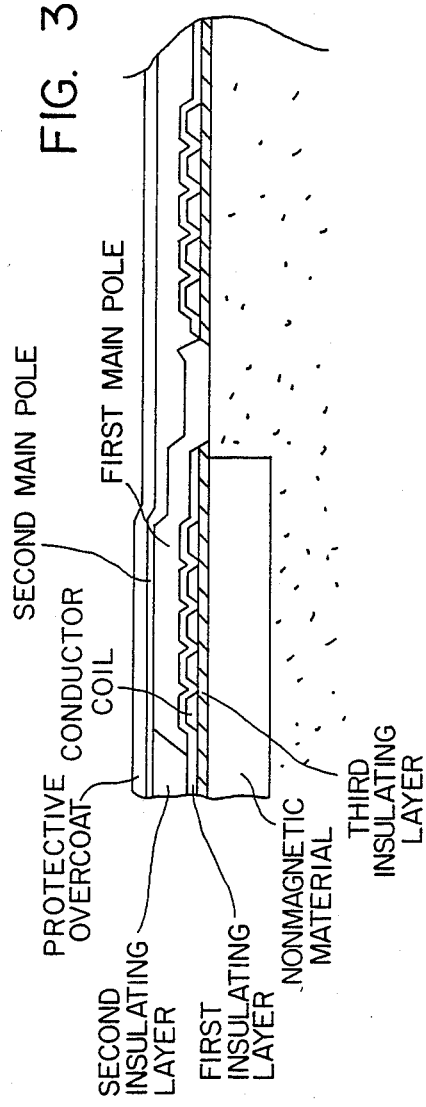
Figure 4:
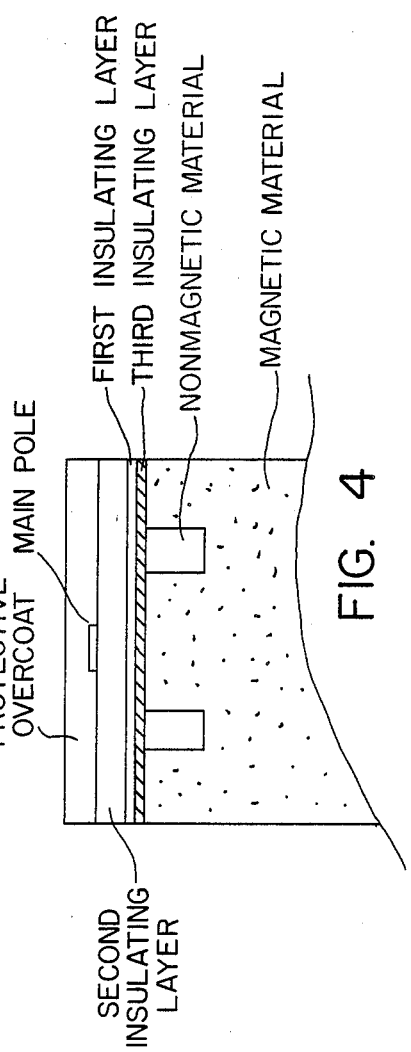

The second main pole having a small thickness in the head of this invention was found to have a coercive force and a permeability which were greatly improved over those of the main pole in the comparative head. FIG. 2 shows the relative output vs. recording density of the two heads. As is obvious therefrom, the head of this invention showed a recording density $D_{50}$ which 1.4 times higher than that of the comparative head, apparently owing to its excellent surface polishing and freedom from distortion.

What is claimed is:

1. A thin-film, perpendicular magnetic recording and reproducing head comprising:
a magnetic substrate which has a mechanochemically polished principal surface, said magnetic substrate being formed of a magnetic material having a principal surface and a nonmagnetic material located in a plurality of grooves in said principal surface;
a thin-film conductor coil located on said polished principal surface of said magnetic substrate;
a first insulating layer of an inorganic oxide covering said magnetic substrate and said conductor coil, said first insulating layer having a thickness of 0.3 to 3.0 μm and including a via hole formed therein which extends to said principal surface of said magnetic substrate and exposes a surface portion thereof;

a first main pole located on the surface of said first insulating layer and said exposed surface portion of said magnetic substrate;

a second insulating layer of an inorganic oxide covering said first main pole and said first insulating layer and being polished to flatten the surface of said second insulating layer to remove its uneveness and leave an exposed finely polished surface portion of said first main pole;

a flat second main pole provided on said finely polished exposed surface portion of said first main pole and polished surface of said second insulating layer, said second main pole having a small thickness; and a protective overcoat covering said second main pole and said second insulating layer;

an exposed end face of the thin-film magnetic head opposite a magnetic recording medium being composed of the magnetic substrate, the nonmagnetic material in the grooves in said magnetic substrate, the first insulating layer which covers the conductor coil, the second insulating layer, the second main pole and the protective overcoat.

2. A thin-film magnetic head as set forth in claim 1, wherein said magnetic material is Ni-Zn ferrite.

3. A thin-film magnetic head as set forth in claim 1, wherein said magnetic material is Mn-Zn ferrite, and wherein a third insulating layer is provided between said magnetic substrate and said coil.

4. A thin-film magnetic head as set forth in claim 1, wherein said nonmagnetic material is selected from the group consisting of glass, $SiO_2$, $Al_2O_3$ and barium titanate.

5. A thin-film magnetic head as set forth in claim 1, wherein said via hole is formed in said first insulating layer by dry etching such as ion beam etching or wet etching.

6. A thin-film magnetic head as set forth in claim 1, wherein said first and second main poles are each formed from a material selected from the group consisting of Permalloy, Sendust, other iron alloys and Co-base amorphous alloys.

7. A thin-film magnetic head as set forth in claim 1, wherein said first and second main poles are each formed by sputtering, vapor deposition or plating.

8. A thin-film magnetic head as set forth in claim 1, wherein said conductor coil consists of at least one conductive layer.

9. A thin-film magnetic head as set forth in claim 1, wherein said conductor coil is formed from a metal selected from the group consisting of copper, aluminum, gold or an alloy or laminate thereof.

10. A thin-film magnetic head as set forth in claim 9, wherein said conductor coil is formed in said magnetic substrate by sputtering, vapor deposition or plating.

11. A thin-film magnetic head as set forth in claim 1, wherein said first and second insulating layer and said overcoat are each films of inorganic oxide.

12. A thin-film magnetic head as set forth in claim 11, wherein said films of inorganic oxide are formed by sputtering or vapor deposition.

13. A thin-film magnetic head as set forth in claim 1, wherein said finely polished surface of said second insulating layer is formed by diamond and mechanochemical polishing.

14. A thin-film magnetic head as set forth in claim 13, wherein said diamond polishing employs a diamond powder having a particle diameter of 1 μm at maximum a lap base formed from tin, copper or cloth, a lap pressure of 0.01 to 1 kg/cm² and a rotating speed of 10 to 100 m/min.

15. A thin-film magnetic head as set forth in claim 1, wherein the mechanochemical polished prinicpal surface of said magnetic substrate is provided by contact with the surface of a rotating disk polisher formed from hard cloth, solder or tin at a lap pressure of 0.01 to 1 kg/cm² and a rotating speed of 10 to 100 m/min. in a suspension containing in pure water 0.5 to 20% by weight of a fine powder of MgO, $ZrO_2$, $Al_2O_3$ or $SiO_2$ having a particle diameter of 0.1 μm at maximum or a mixture thereof.

16. A thin-film magnetic head as set forth in claim 15, wherein said mechanochemically polished principal surface of said substrate and said polished surfaces of said first main pole and said second insulating layer are each a distortion-free surface having a maximum roughness of 100 Å.

17. A thin-film magnetic head as set forth in claim 16, wherein said maximum roughness is 40 Å.

18. A thin-film, perpendicular magnetic recording and reproducing head which displays a high recording density and a high reproducing output over a high frequency range which is formed by the steps of (1) providing a magnetic substrate which has a principal surface and which is made of a magnetic material having a principal surface and a nonmagnetic material located in a plurality of grooves in said prinicipal surface, (2) mechanochemically polishing the principal surface of said magnetic substrate;

(3) forming a thin-film conductor coil on said mechanochemically polished principal surface of said magnetic substrate;

(4) forming a first insulating layer of an inorganic oxide on said mechanochemically polished principal surface of said magnetic substrate layer having a thickness of 0.3 to 3.0 μm;

(5) forming a return path in said first insulating layer which extends from an exposed surface of said first insulating layer to said principal surface of said magnetic substrate to expose a surface portion thereof;

(6) forming a first main pole on the surface of said first inslauting layer and said exposed surface portion of the principal surface of said magnetic substrate;

(7) forming a second insulating layer of an inorganic oxide on said first main pole and said exposed surface portion of the first insulating layer;

(8) finely polishing the surface of said second insulating layer until a surface portion of said first main pole is exposed and both said surface of said second insulating layer and said surface portion of said first main pole have a roughness not exceeding 500 Å;

(9) mechanochemically polishing said finely polished surfaces of said second insulating layer and said first main pole to a roughness not exceeding 100 Å;

(10) forming a second main pole on said mechanochemically polished surfaces of said second insulating layer and said first main pole, and

(11) forming a protective overcoat over said second main pole and said second insulation layer.

* * * * *